US009173062B2

(12) United States Patent
Hu et al.

(10) Patent No.: US 9,173,062 B2
(45) Date of Patent: Oct. 27, 2015

(54) POSITIONING SERVICE METHOD AND SYSTEM, AND TERMINAL

(75) Inventors: Yonggang Hu, Shenzhen (CN); Xiaoli Yuan, Shenzhen (CN); Guangliang Cheng, Shenzhen (CN); Wenhuan Wang, Shenzhen (CN)

(73) Assignee: ZTE CORPORATION (CN)

( * ) Notice: Subject to any disclaimer, the term of this patent is extended or adjusted under 35 U.S.C. 154(b) by 0 days.

(21) Appl. No.: 13/988,543

(22) PCT Filed: Jul. 20, 2011

(86) PCT No.: PCT/CN2011/077393
§ 371 (c)(1),
(2), (4) Date: May 21, 2013

(87) PCT Pub. No.: WO2012/167483
PCT Pub. Date: Dec. 13, 2012

(65) Prior Publication Data
US 2014/0080508 A1    Mar. 20, 2014

(30) Foreign Application Priority Data

Jun. 9, 2011   (CN) .......................... 2011 1 0154316

(51) Int. Cl.
*H04W 4/20*    (2009.01)
*H04W 4/02*    (2009.01)
(Continued)

(52) U.S. Cl.
CPC ............... *H04W 4/021* (2013.01); *G01S 19/42* (2013.01); *H04W 4/028* (2013.01); *H04W 4/20* (2013.01); *H04W 64/006* (2013.01); *H04W 4/001* (2013.01); *H04W 4/023* (2013.01)

(58) Field of Classification Search
USPC ............... 340/539.1–539.15; 455/456.1–457, 455/404.1, 404.2
See application file for complete search history.

(56) References Cited

U.S. PATENT DOCUMENTS 6,965,827 B1 *  11/2005  Wolfson ........................ 701/454
2003/0073440 A1 *  4/2003  Mukherjee et al. ........... 455/435
(Continued)

FOREIGN PATENT DOCUMENTS

CN    1402195    3/2003
CN    101000373    7/2007
(Continued)

OTHER PUBLICATIONS

International Search Report for International Patent Application No. PCT/CN2011/077393, mailed Mar. 22, 2012.
(Continued)

*Primary Examiner* — Daniel Lai
(74) *Attorney, Agent, or Firm* — McAndrews, Held & Malloy, Ltd.

(57) ABSTRACT

The disclosure provides a positioning service method and system, and a terminal. In the above method, a positioned terminal receives a movement track model established by a positioning service platform; the positioned terminal judges whether or not positioning data that are collected satisfy the movement track model; and when the positioning data satisfy the movement track model, it is determined that there is no need to report the positioning data, and when the positioning data do not satisfy the movement track model, the positioning data are reported to the positioning service platform. The technical solution provided by the disclosure can reduce the frequency for the positioned terminal to report the positioning data and also save network data traffic for the user.

9 Claims, 6 Drawing Sheets

(51) Int. Cl.
*G01S 19/42* (2010.01)
*H04W 64/00* (2009.01)
*H04W 4/00* (2009.01)

(56) References Cited

U.S. PATENT DOCUMENTS

| | | | |
|---|---|---|---|
| 2006/0003778 A1* | 1/2006 | Hogdahl et al. | 455/466 |
| 2008/0158002 A1* | 7/2008 | Parkinson et al. | 340/825.49 |
| 2010/0210240 A1* | 8/2010 | Mahaffey et al. | 455/411 |
| 2010/0279706 A1 | 11/2010 | Dicke | |
| 2011/0022710 A1* | 1/2011 | Choi | 709/224 |
| 2011/0055546 A1* | 3/2011 | Klassen et al. | 713/150 |

FOREIGN PATENT DOCUMENTS

| | | |
|---|---|---|
| CN | 101261134 | 9/2008 |
| WO | 2007/066849 | 6/2007 |
| WO | 2009/019672 A1 | 2/2009 |

OTHER PUBLICATIONS

Communication dated Mar. 5, 2014 with Supplementary European Search Report corresponding to European Application No. EP11867364.9, Feb. 24, 2014, 6 pages.

* cited by examiner

POSITIONING SERVICE METHOD AND SYSTEM, AND TERMINAL

TECHNICAL FIELD

The disclosure relates to the field of communications, and particularly, to a positioning service method and system, and a terminal.

BACKGROUND

With rapid development of mobile terminals, more and more convenient services can be provided to people by the mobile terminals and the life of people is made much easier. Currently, China Mobile launches a Qinqingtong service (family member positioning service), which provides good service and convenience to people for supporting elders or raising kids.

The service objects of the family member positioning service are mainly elders and kids. Usually, the parents of the kids or the children of the elders are positioning initiators, and the elders and the kids are people to be positioned. A positioning initiator can regularly query the location of a person to be positioned by way of short messages, Web (Web, network and Internet), wireless application protocol (WAP), voice and so on in real time, and query and obtain a movement track of the person to be positioned and surrounding information about the location of the person to be positioned by way of Web, WAP, multimedia messages and so on. When the location of the person to be positioned exceeds a preset range, the positioning initiator can be notified by way of short message alert. The positioning initiator can also obtain a route track, including a travelling route or a bus line, etc., between the positioning initiator himself and the person to be positioned according to the real-time location of the positioning initiator.

A guardian (the positioning initiator) positions the location of an elder or a kid using a customized terminal of the family member positioning service to obtain the movement track of the elder or the kid, and can be alarmed when movement of the elder or the kid exceeds the preset range and so on. This service can obtain relevant information about the elder or the kid such as location and so on timely and effectively and give the elder or the kid emergent help and care.

Currently, the positioned terminal required by the family member positioning service is mainly a positioning terminal of a global positioning system (GPS) which can realize a positioning function or a cell identity (Cell ID) positioning terminal. The GPS positioning terminal can realize high positioning precision; however, the positioning precision realized by the Cell ID positioning terminal is rather low.

However, the family member positioning service launched currently has the following three defects.

(1) The positioning information about the positioned terminal is reported frequently, which generates a large amount of network traffic. After the positioning service is opened, the positioned terminal has to position it own location continuously and actively report the same to a family member positioning service platform for storage and processing, which will generate much network data traffic.

(2) A service operation of fixed regional alarm is adopted. After the positioning service is opened, the guardian can log into the family member positioning service platform to set the range of regional alarm, and if the positioned terminal exceeds this regional range, then alarm information is sent to the guardian actively for prompt. If the guardian and the positioned terminal exceed the range of the regional alarm together, alarm prompt will also be performed, and such design is inappropriate.

(3) A specially customized mobile terminal is required. Current family member positioning service specifications definitely require this service to have a specially customized mobile terminal: a GPS positioning terminal or a Cell ID positioning terminal. When using a specially customized mobile terminal, the user has to pay additionally, and for the operators, it is not convenient for the wide application of the service.

SUMMARY

As to the problem in the related art that the positioning information about the positioned terminal is reported frequently, which generates a large amount of network traffic, the disclosure provides a positioning service method and system, and a terminal, so as to solve at least one of the above problems.

A positioning service method is provided according to one aspect of the disclosure.

The positioning service method according to the disclosure includes: a positioned terminal receiving a movement track model established by a positioning service platform; the positioned terminal judging whether or not positioning data that are collected satisfy the movement track model; and when the positioning data satisfy the movement track model, determining that there is no need to report the positioning data, and when the positioning data do not satisfy the movement track model, reporting the positioning data to the positioning service platform.

The positioned terminal judging whether or not the positioning data that are collected satisfy the movement track model includes: the positioned terminal judging whether or not the positioning data that are collected satisfy a coordinate location condition and a time point condition simultaneously; and if the positioning data that are collected satisfy both the coordinate location condition and the time point condition simultaneously, determining that the positioning data satisfy the movement track model, and if the positioning data that are collected do not satisfy the coordinate location condition and the time point condition simultaneously, determining that the positioning data do not satisfy the movement track model.

The movement track model includes: a coordinate location, a time point, a location threshold range, and a time threshold range; judging whether or not the positioning data that are collected satisfy the coordinate location condition includes: judging whether or not a coordinate location in the positioning data is within an allowed range specified by the location threshold range and the coordinate location of a key location in the movement track model; and judging whether or not the positioning data that are collected satisfy the time point condition includes: judging whether or not a collection time point of the positioning data is within an allowed range specified by the time threshold range and the time point of a key location in the movement track model.

Before the positioned terminal collects the positioning data, the method further includes: when a subscriber identity module tool kit (STK) service module of the positioned terminal is initialized, receiving device capability information from the positioned terminal; and the STK service module judging whether or not the positioned terminal has a global positioning system (GPS) positioning function according to the device capability information.

After the STK service module judges whether or not the positioned terminal has the GPS positioning function according to the device capability information, the method further includes: if the positioned terminal has the GPS positioning function, the STK service module notifying the positioned terminal to collect the positioning data, and the positioned terminal performing the GPS positioning function to collect the positioning data, and if the collection has failed, the positioned terminal performing a low precision positioning function according to a cell identity to collect the positioning data; and if the positioned terminal does not have the GPS positioning function, the positioned terminal performing the low precision positioning function to collect the positioning data.

The method further includes: the positioning service platform determining whether or not to adjust a positioning mode of the positioned terminal according to a distance between a positioning initiation terminal and the positioned terminal, wherein the positioning mode includes: a silence mode and an activated positioning mode.

The positioning service platform determining whether or not to adjust the positioning mode of the positioned terminal according to the distance between the positioning initiation terminal and the positioned terminal includes: the positioning service platform judging, according to network side data, whether or not a cell identity of a mobile network to which the positioning initiation terminal registers and a cell identity of a mobile network to which the positioned terminal registers are identical; if the cell identity of the mobile network to which the positioning initiation terminal registers and the cell identity of the mobile network to which the positioned terminal registers are identical, then the positioning service platform determining that the distance between the positioning initiation terminal and the positioned terminal is less than a preset threshold, and issuing an instruction to adjust the positioning mode of the positioned terminal as the silence mode; when a cell identity of a network where the positioning initiation terminal or the positioned terminal resides changes, the positioning service platform judging whether or not there is a need to adjust the positioning mode of the positioned terminal as the activated positioning mode.

When both the positioning initiation terminal and the positioned terminal have a GPS positioning function, the positioning service platform judging whether or not there is the need to adjust the positioning mode of the positioned terminal as the activated positioning mode includes: the positioning service platform notifying the positioning initiation terminal and the positioned terminal to collect and report a coordinate location; the positioning service platform determining whether or not the distance between the positioning initiation terminal and the positioned terminal is less than the preset threshold according to the coordinate location reported by the positioning initiation terminal and the coordinate location reported by the positioned terminal; and if the distance between the positioning initiation terminal and the positioned terminal is not less than the preset threshold, determining to adjust the positioning mode of the positioned terminal as the activated positioning mode.

A positioning service system is provided according to another aspect of the disclosure.

The positioning service system according to the disclosure includes a positioned terminal, wherein the positioned terminal includes: a receiving module, configured to receive a movement track model established by a positioning service platform; a judgment module, configured to judge whether or not positioning data that are collected satisfy the movement track model; a determination module, configured to determine that there is no need to report the positioning data when the positioning data satisfy the movement track model; and a reporting module, configured to report the positioning data to the positioning service platform when the positioning data do not satisfy the movement track model.

The positioned terminal further includes: a subscriber identity module tool kit (STK) service module, configured to, when being initialized, receive device capability information from the positioned terminal and judge whether or not the positioned terminal has a global positioning system (GPS) positioning function according to the device capability information.

The system further includes: a positioning service platform, configured to determine whether or not to adjust a positioning mode of the positioned terminal according to a distance between a positioning initiation terminal and the positioned terminal, wherein the positioning mode includes: a silence mode and an activated positioning mode.

The positioning service platform includes: a first judgment module, configured to judge whether or not a cell identity of a mobile network to which the positioning initiation terminal registers and a cell identity of a mobile network to which the positioned terminal registers are identical according to network side data an adjustment module, configured to, if an output of the judgment module is yes, determine that the distance between the positioning initiation terminal and the positioned terminal is less than a preset threshold, and issue an instruction to adjust the positioning mode of the positioned terminal as the silence mode; and a second judgment module, configured to, when a cell identity of a network where the positioning initiation terminal or the positioned terminal resides changes, judge whether or not there is a need to adjust the positioning mode of the positioned terminal as the activated positioning mode.

The second judgment module includes: a notification unit, configured to notify the positioning initiation terminal and the positioned terminal to collect and report a coordinate location; as judgment unit, configured to determine whether or not the distance between the positioning initiation terminal and the positioned terminal is less than the preset threshold according to the coordinate location reported by the positioning initiation terminal and the coordinate location reported by the positioned terminal; and a determination unit, configured to, when an output of the judgment unit is no, determine to adjust the positioning mode of the positioned terminal as the activated positioning mode; the positioned terminal is further configured to perform a GPS positioning function and report the coordinate location corresponding to the positioned terminal to the positioning service platform; and the system further includes: the positioning initiation terminal, configured to perform the GPS positioning function and report the coordinate location corresponding to the positioning initiation terminal to the positioning service platform.

A terminal is provided according to still another aspect of the disclosure.

The terminal according to the disclosure includes: a receiving module, configured to receive a movement track model established by a positioning service platform; a judgment module, configured to judge whether or not positioning data that are collected satisfy the movement track model; a determination module, configured to determine that there is no need to report the positioning data when the positioning data satisfy the movement track model; and a reporting module, configured to report the positioning data to the positioning service platform when the positioning data do not satisfy the movement track model.

By way of the disclosure, the positioned terminal receives the movement track model established by the positioning service platform and reports the positioning data when a movement track of the positioned terminal is not complied with the above movement track model, thereby solving the problem in the related art that the positioning information about the positioned terminal is reported frequently, which generates a large amount of network traffic, thus the frequency for the positioned terminal to report the positioning data can be reduced, and the network data traffic is also saved for the user.

By way of the disclosure, the positioned terminal receives the movement track model established by the positioning service platform and reports the positioning data when a movement track of the positioned terminal is not complied with the above movement track model, thereby solving the problem in the related art that the positioning information about the positioned terminal is reported frequently, which generates a large amount of network traffic, thus the frequency for the positioned terminal to report the positioning data can be reduced, and the network data traffic is also saved for the user.

BRIEF DESCRIPTION OF THE DRAWINGS

Drawings, provided for further understanding of the disclosure and forming a part of the specification, are used to explain the disclosure together with embodiments of the disclosure rather than to limit the disclosure, wherein.

DETAILED DESCRIPTION OF EMBODIMENTS

The disclosure will be described hereinafter in detail with reference to the accompanying drawings and in conjunction with embodiments. It needs to be noted that the embodiments of the present application and the features in the embodiments can be combined with each other if there is no conflict.

A positioning service system is provided according to an embodiment of the disclosure.

Figure 1:
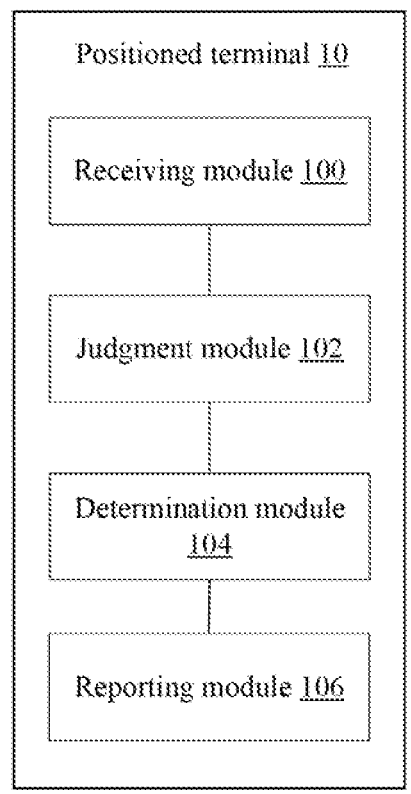
FIG. 1 is a structural block diagram of a positioning service system according to an embodiment of the disclosure.

FIG. 1 is a structural block diagram of a positioning service system according to the embodiment of the disclosure. As shown in FIG. 1, the positioning service system includes: a positioned terminal 10.

The above positioned terminal 10 may further include:

a receiving module 100, configured to receive a movement track model established by a positioning service platform;

a judgment module 102, configured to judge whether or not positioning data that are collected satisfy the movement track model;

a determination module 104, configured to determine that there is no need to report the positioning data when the positioning data satisfy the movement track model; and a reporting module 106, configured to report the positioning data to the positioning service platform when the positioning data do not satisfy the movement track model.

In the related art, after a positioning service is opened, the positioned terminal has to position its own location continuously and actively report the same to a family member positioning service platform for storage and processing, which will generate much network data traffic. The positioned terminal 10 as shown in FIG. 1 receives the movement track model established by the positioning service platform and reports the positioning data when a movement track of the positioned terminal 10 is not complied with the above movement track model, thereby solving the problem in the related art that positioning information about the positioned terminal is reported frequently, which generates a large amount of network traffic, thus the frequency for the positioned terminal to report the positioning data can be reduced, and the network data traffic is also saved for the user.

Preferably, the above judgment module 102 may further perform the following processing. The judgment module 102 judges whether or not the positioning data that are collected satisfy a coordinate location condition and a time point condition simultaneously; and if the positioning data that are collected satisfy both the coordinate location condition and the time point condition simultaneously, then the judgment module 102 determines that the positioning data satisfy the movement track model, otherwise, determines that the positioning data do not satisfy the movement track model.

During preferred implementation, the above movement track model may further include: a coordinate location, a time point, a location threshold range, and a time threshold range. The manner in which the above judgment module 102 judges whether or not the positioning data that are collected satisfy the coordinate location condition may include: it is judged whether or not a coordinate location in the positioning data is within an allowed range specified by the location threshold range and the coordinate location of a key location in the movement track model. The manner in which the above judgment module 102 judges whether or not the positioning data that are collected satisfy the time point condition may include: it is judged whether or not a collection time point of the positioning data is within an allowed range specified by the time threshold range and the time point of a key location in the movement track model.

During specific implementation, the user opens a positioning service and obtains positioning authorization of the positioned terminal when positioning for the first time. The user logs into the positioning service platform to select key locations to establish the movement track model according to the movement track uploaded by the positioned terminal (the movement track may be data of one day or continuous days). This movement track model specifically consists of a coordinate location, a time point, a location threshold range, and a time threshold range. The coordinate location is represented by longitudes and latitudes. The time point is the time when the positioned terminal arrives at a certain coordinate location and can be exact as second. The location threshold range is the geographical location area range allowed at the key locations of the movement track model. The time threshold range is the allowed error before and after the positioned terminal arrives at a certain coordinate location.

After the movement track model is established, the positioning service platform issues this movement track model to the positioned terminal 10 for local storage. The positioned terminal 10 calculates the positioning data collected each time and the locally stored movement track model to compare whether or not the positioning data are complied with the movement track model. If the positioning data are complied with the movement track model, then the positioning data need not be reported; and if the positioning data are not complied with the movement track model, then the positioning data collected this time are reported to the positioning service platform for storage and processing.

In the above, whether or not the positioning data are complied with the movement track model is determined by the following conditions: the coordinate location condition and the time point condition, if one or these two conditions is not satisfied, then it is deemed that the positioning data collected this time are not complied with the movement track model, i.e. if the positioning data collected at a key point satisfy the time point condition but do not satisfy the coordinate location condition, or if the coordinate location condition is met but the time point condition is not met, or both of them are not met, then the positioning data are reported.

In the above, the coordinate location condition refers to whether or not a collected coordination location is within the allowed range specified by the location threshold range and the coordinate of a key location in the movement track model. The time point condition refers to whether or not the time when collecting the positioning data is within the allowed range specified by the time threshold range and the time point of the key location in the movement track model.

Figure 2:
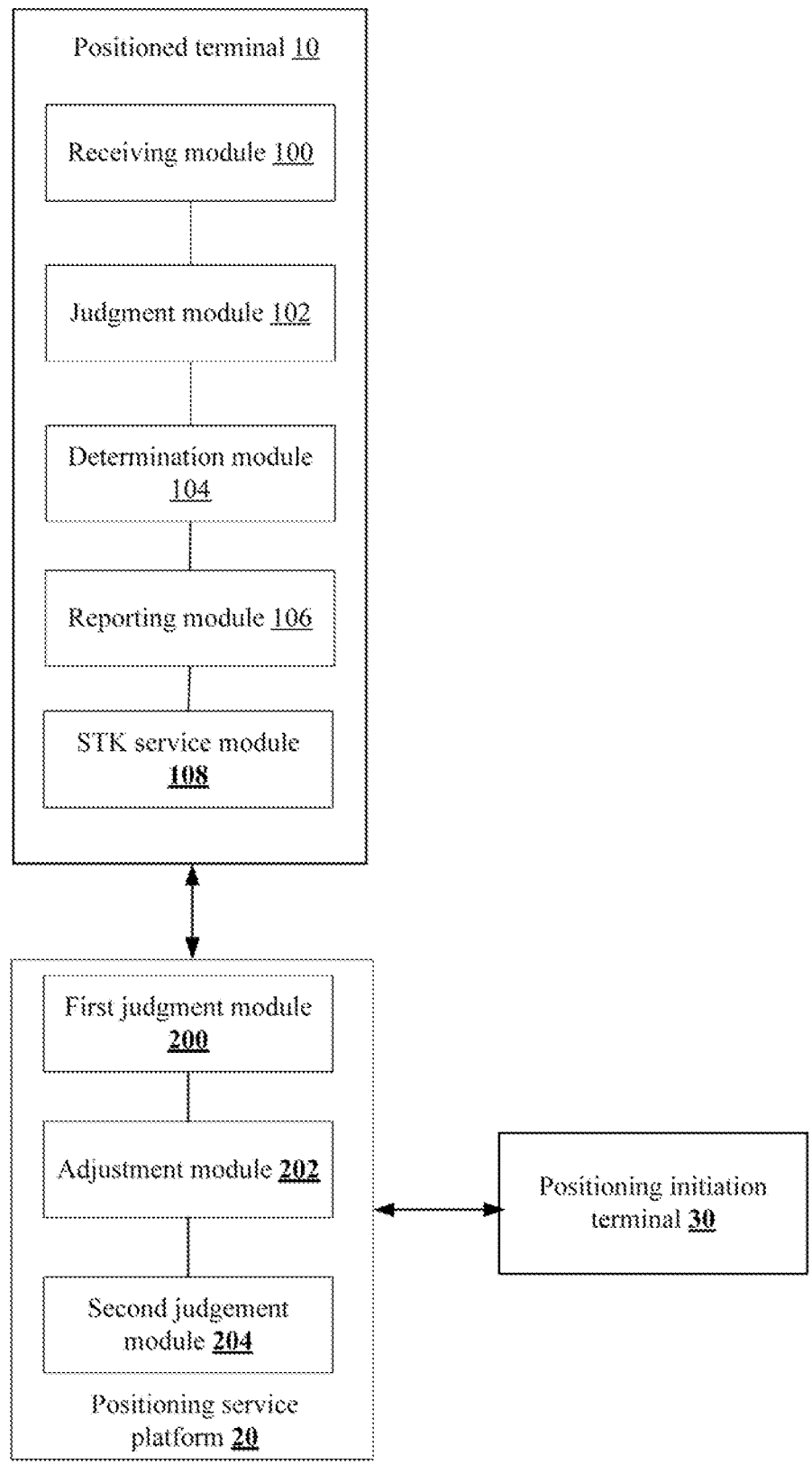
FIG. 2 is a structural block diagram of a positioning service system according to a preferred embodiment of the disclosure.

Preferably, as shown in FIG. 2, the above positioned terminal 10 may further include: a subscriber identity module tool kit (STK) service module 108, configured to, when being initialized, receive device capability information from the positioned terminal and judge whether or not the positioned terminal has a GPS positioning function according to the device capability information.

During preferred implementation, if the positioned terminal has the GPS positioning function, then the STK service module 108 notifies the positioned terminal to collect the positioning data, and the positioned terminal performs the GPS positioning function to collect the positioning data, and if the collection has failed, then the positioned terminal performs a low precision positioning function according to a cell identity to collect the positioning data; and if the positioned terminal does not have the GPS positioning function, then the positioned terminal performs the low precision positioning function to collect the positioning data.

During specific implementation, the positioning service can be integrated into the STK service module 108. When the STK service module 108 is initialized, the positioned terminal (such as a mobile terminal) reports the device capability of the positioned terminal, then the STK service module 108 can judge whether or not the positioned terminal has the GPS positioning function to provide the high precision positioning service or the low precision positioning service and report the same to the positioning service platform 20.

If the positioned terminal has the GPS positioning function, then after the user has opened the positioning service, the positioning data can be collected by notifying the mobile terminal by way of the STK service module. If the collection is successful, then the positioning data are reported to the positioning service platform for processing and storage; and if the collection has failed, then low precision positioning can be performed and the cell identity of the network where the mobile terminal resides can be reported to the positioning service platform for processing and storage.

If the positioned terminal does not have the GPS positioning function, then after the user has opened the positioning service, only low precision positioning service can be performed, i.e. the low precision positioning service is performed according to the cell identity of the network where the mobile terminal resides.

Preferably, as shown in FIG. 2, the above system may further include: a positioning service platform 20, configured to determine whether or not to adjust a positioning mode of the positioned terminal according to a distance between a positioning initiation terminal and the positioned terminal, wherein the positioning mode includes: a silence mode and an activated positioning mode.

Preferably, as shown in FIG. 2, the above positioning service platform 20 may further include: a first judgment module 200, configured to judge whether or not a cell identity of a mobile network to which the positioning initiation terminal registers and a cell identity of a mobile network to which the positioned terminal registers are identical according to network side data; and an adjustment module 202, configured to, if the output of the judgment module is yes, then determine that the distance between the positioning initiation terminal and the positioned terminal is less than a preset threshold, and issue an instruction to adjust the positioning mode of the positioned terminal as the silence mode; and a second judgment module 204 configured to, when the cell identity of the network where the positioning initiation terminal or the positioned terminal resides changes, judge whether or not there is a need to adjust the positioning mode of the positioned terminal as the activated positioning mode.

Preferably, as shown in FIG. 2, the above second judgment module 204 may further include: a notification unit 2040 (not shown in FIG. 2), configured to notify the positioning initiation terminal and the positioned terminal to collect and report the coordinate location; a judgment unit 2042 (not shown in FIG. 2), configured to determine whether or not the distance between the positioning initiation terminal and the positioned terminal is less than the preset threshold according to the coordinate location reported by the positioning initiation terminal and the coordinate location reported by the positioned terminal; and a determination unit 2044 (not shown in FIG. 2), configured to, when the output of the judgment unit is no, then determine, to adjust the positioning mode of the positioned terminal as the activated positioning mode; the positioned terminal 10 is further configured to perform the GPS positioning function and report the coordinate location corresponding to the positioned terminal 10 to the positioning service platform; and the system further includes: the positioning initiation terminal 30, configured to perform the GPS positioning function and report the coordinate location corresponding to the positioned terminal 10 to the positioning service platform.

During specific implementation, if the positioning initiation terminal is close to the positioned terminal, then the positioning data of the positioned terminal need not be collected or reported, and the positioning service platform issues an instruction to adjust the positioning mode of the positioned terminal as the silence mode, which can reduce the battery consumption of the positioned terminal and increase the endurance time. If the positioning initiation terminal is far away from the positioned terminal, then the positioning mode of the positioned terminal is automatically adjusted as the activated positioning mode.

For example, the positioning service platform can judge whether or not the cell identity of the mobile network to which the positioning initiation terminal registers and the cell identity of the mobile network to which the positioned terminal registers are identical by way of network side data, and if the cell identities are identical, then it is deemed that the positioning initiation terminal is close to the positioned terminal, and the positioning service platform issues an instruction to adjust the positioning mode of the positioned terminal as the silence mode and the positioned terminal no longer collects the positioning data; and when the cell identity of the network to which the positioning initiation terminal or the positioned terminal resides changes, then the judgment condition mentioned above is activated to perform judgment.

Furthermore, if both the positioning initiation terminal and the positioned terminal have the GPS positioning function, when the cell identity of the network where the positioning initiation terminal resides and the cell identity of the network where the positioned terminal resides change to be different from identical, then the positioning service platform can require to collect and report the coordinate location of the positioning initiation terminal and the positioned terminal, then it can be accurately judged whether or not the distance between the positioning initiation terminal and the positioned terminal is close so as to automatically adjust the positioning mode of the positioned terminal.

When the condition that the positioning initiation terminal is close to the positioned terminal is not satisfied, the positioning service platform issues an instruction to activate the positioning mode of the positioned terminal.

A terminal is also provided according to an embodiment of the disclosure.

Specifically, referring to FIG. 1, the terminal includes: a receiving module 100, configured to receive a movement track model established by a positioning service platform; a judgment module 102, configured to judge whether or not positioning data that are collected satisfy the movement track model; a determination module 104, configured to determine that there is no need to report the positioning data when the positioning data satisfy the movement track model; and a reporting module 106, configured to report the positioning data to the positioning service platform when the positioning data do not satisfy the movement track model.

Preferably, the above terminal may further include: an STK service module, configured to, when being initialized, receive device capability information from the positioned terminal and judge whether or not the positioned terminal has a GPS positioning function according to the device capability information.

A positioning service method is also provided according to an embodiment of the disclosure.

Figure 3:
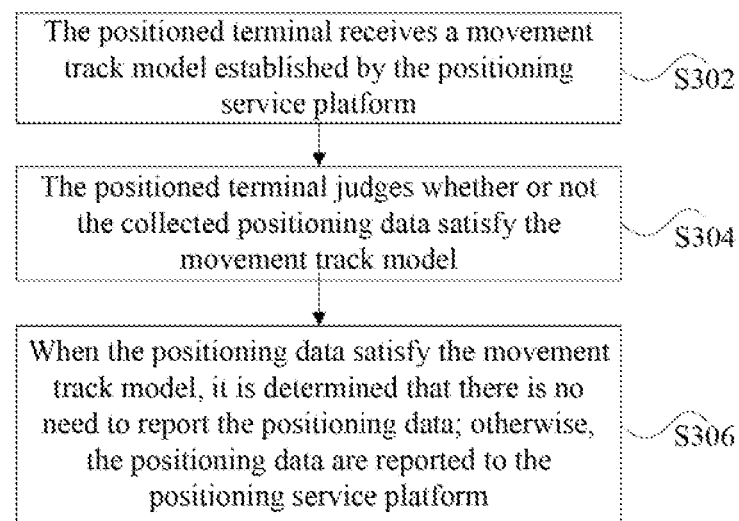
FIG. 3 is a flowchart of a positioning service method according to an embodiment of the disclosure.

FIG. 3 is a flowchart of a positioning service method according to the embodiment of the disclosure. As shown in FIG. 3, the positioning service method mainly includes:

Step S302: a positioned terminal receives a movement track model established by a positioning service platform;

Step S304: the positioned terminal judges whether or not positioning data that are collected satisfy the movement track model; and Step S306: when the positioning data satisfy the movement track model, it is determined that there is no need to report the positioning data, otherwise, the positioning data are reported to the positioning service platform.

In the positioning service method shown in FIG. 3, the positioned terminal receives the movement track model established by the positioning service platform and reports the positioning data when the movement track of the positioned terminal is not complied with the above movement track model, thereby solving the problem in the related art that the positioning information about the positioned terminal is reported frequently, which generates a large amount of network traffic, thus the frequency for the positioned terminal to report the positioning data can be reduced, and the network data traffic is also saved for the user.

Preferably, the above step S304 may further include the following processing:

(1) the positioned terminal judges whether or not the positioning data that are collected satisfy a coordinate location condition and a time point condition simultaneously; and (2) if the coordinate location condition and the time point condition are met simultaneously, then it is determined that the positioning data satisfy the movement track model, otherwise, it is determined that the positioning data do not satisfy the movement track model.

Preferably, the above movement track model includes: a coordinate location, a time point, a location threshold range, and a time threshold range. The step of judging whether or not the positioning data that are collected satisfy the coordinate location condition includes: it is judged whether or not a coordinate location in the positioning data is within an allowed range specified by the location threshold range and the coordinate location of a key location in the movement track model. The step of judging whether or not the positioning data that are collected satisfy the time point condition includes: it is judged whether or not a collection time point of the positioning data is within an allowed range specified by the time threshold range and the time point of a key location in the movement track model.

Preferably, before the positioned terminal collects the positioning data, the method may further include the following processing:

(1) when an STK service module of the positioned terminal is initialized, device capability information is received from the positioned terminal; and (2) the STK service module judges whether or not the positioned terminal has a GPS positioning function according to the device capability information.

Preferably, after the above processing (2), the method may further include the following processing. If the positioned terminal has the GPS positioning function, then the STK service module notifies the positioned terminal to collect the positioning data, and the positioned terminal performs the GPS positioning function to collect the positioning data, and if the collection has failed, the positioned terminal performs a low precision positioning function according to a cell identity to collect the positioning data; and if the positioned terminal does not have the GPS positioning function, the positioned terminal performs the low precision positioning function to collect the positioning data.

Preferably, the above positioning service method may include the following processing. The positioning service platform determines whether or not to adjust a positioning mode of the positioned terminal according to a distance between a positioning initiation terminal and the positioned terminal, wherein the positioning mode includes: a silence mode and an activated positioning mode.

During preferred implementation, the positioning service platform determining whether or not to adjust the positioning mode of the positioned terminal may further include the following processing:

(1) the positioning service platform judges whether or not a cell identity of a mobile network to which the positioning initiation terminal registers and a cell identity of a mobile network to which the positioned terminal registers are identical;

(2) if they are identical, then the positioning service platform determines that the distance between the positioning initiation terminal and the positioned terminal is less than a preset threshold, and issues an instruction to adjust the positioning mode of the positioned terminal as the silence mode; and (3) when the cell identity of the network where the positioning initiation terminal or the positioned terminal resides changes, the positioning service platform judges whether or not there is a need to adjust the positioning mode of the positioned terminal as the activated positioning mode.

During preferred implementation, when both the positioning initiation terminal and the positioned terminal have the GPS positioning function, the positioning service platform judging whether or not to adjust the positioning mode of the positioned terminal as the activated positioning mode may further include the following processing:

(3.1) the positioning service platform notifies the positioning initiation terminal and the positioned terminal to collect and report the coordinate location;

(3.2) the positioning service platform determines whether or not the distance between the positioning initiation terminal and the positioned terminal is less than the preset threshold according to the coordinate location reported by the positioning initiation terminal and the coordinate location reported by the positioned terminal; and (3.3) if the distance is not less than the preset threshold, it is determined to adjust the positioning mode of the positioned terminal as the activated positioning mode.

The above preferred embodiment will be described in conjunction with FIGS. 4 and 5.

Figure 4:
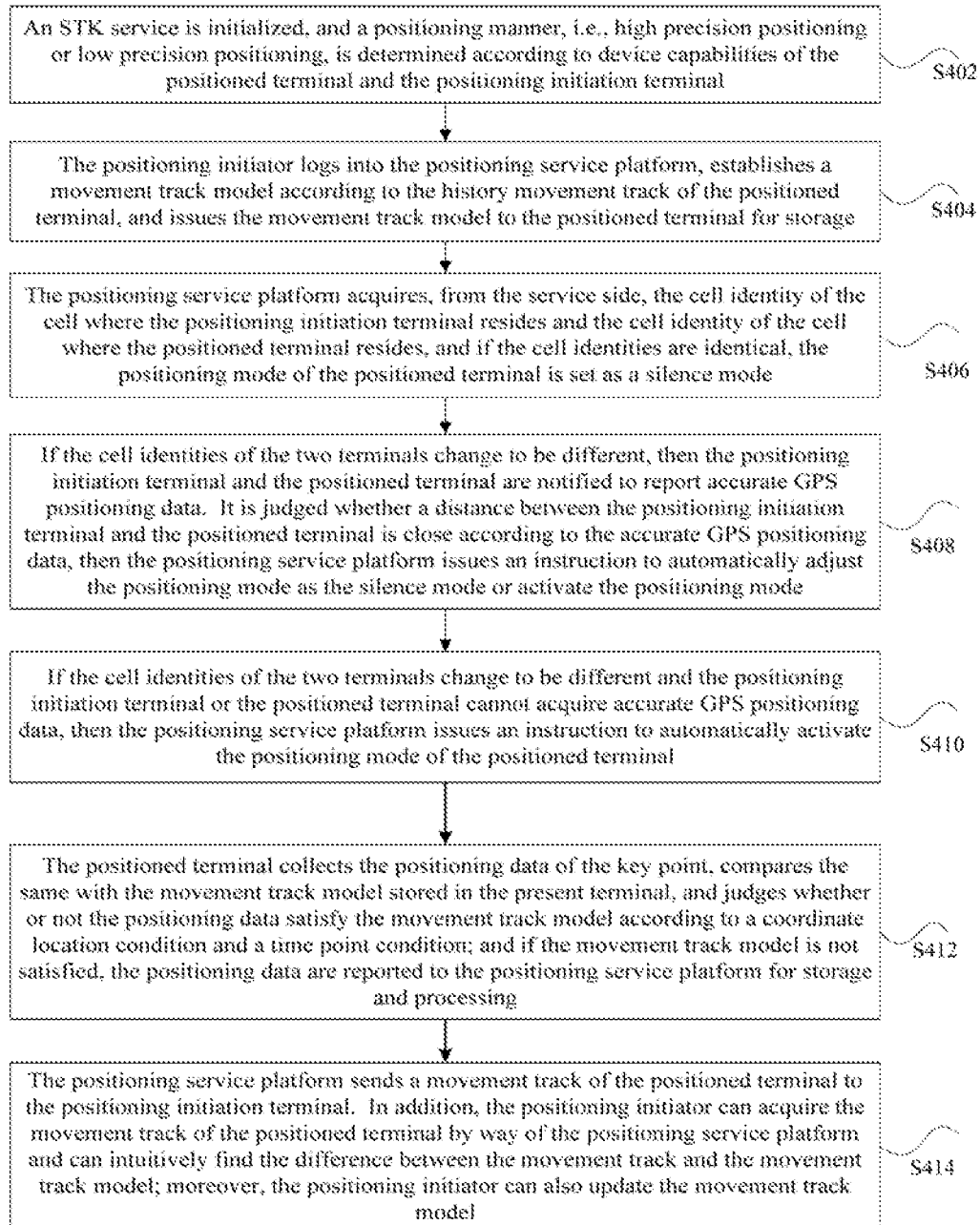
FIG. 4 is a flowchart of a positioning service method according to a preferred embodiment of the disclosure.

FIG. 4 is a flowchart of a positioning service method according to a preferred embodiment of the disclosure. As shown in FIG. 4, the positioning service method mainly includes the following processing.

Step S402: An STK service is initialized, and a positioning manner, i.e., high precision positioning or low precision positioning, is determined according to device capabilities of the positioned terminal and the positioning initiation terminal.

Step S404: The positioning initiator logs into the positioning service platform, establishes a movement track model according to the history movement track of the positioned terminal, and issues the movement track model to the positioned terminal for storage.

Step S406: The positioning service platform acquires, from the service side, the cell identity of the cell where the positioning initiation terminal resides and the cell identity of the cell where the positioned terminal resides, and if the cell identities are identical, the positioning mode of the positioned terminal is set as a silence mode.

Step S408: If the cell identities of the two terminals change to be different, then the positioning initiation terminal and the positioned terminal are notified to report accurate GPS positioning data. It is judged whether a distance between the positioning initiation terminal and the positioned terminal is close according to the accurate GPS positioning data, then the positioning service platform issues an instruction to automatically adjust the positioning mode as the silence mode or activate the positioning mode.

Step S410: if the cell identities of the two terminals change to be different and the positioning initiation terminal or the positioned terminal cannot acquire accurate GPS positioning data, then the positioning service platform issues an instruction to automatically activate the positioning mode of the positioned terminal.

Step S412: The positioned terminal collects the positioning data of the key point, compares the same with the movement track model stored in the present terminal, and judges whether or not the positioning data satisfy the movement track model according to a coordinate location condition and a time point condition; and if the movement track model is not satisfied, the positioning data are reported to the positioning service platform for storage and processing.

Step S414: The positioning service platform sends a movement track of the positioned terminal to the positioning initiation terminal. In addition, the positioning initiator can acquire the movement track of the positioned terminal by way of the positioning service platform and can intuitively find the difference between the movement track and the movement track model; moreover, the positioning initiator can also update the movement track model.

Figure 5:
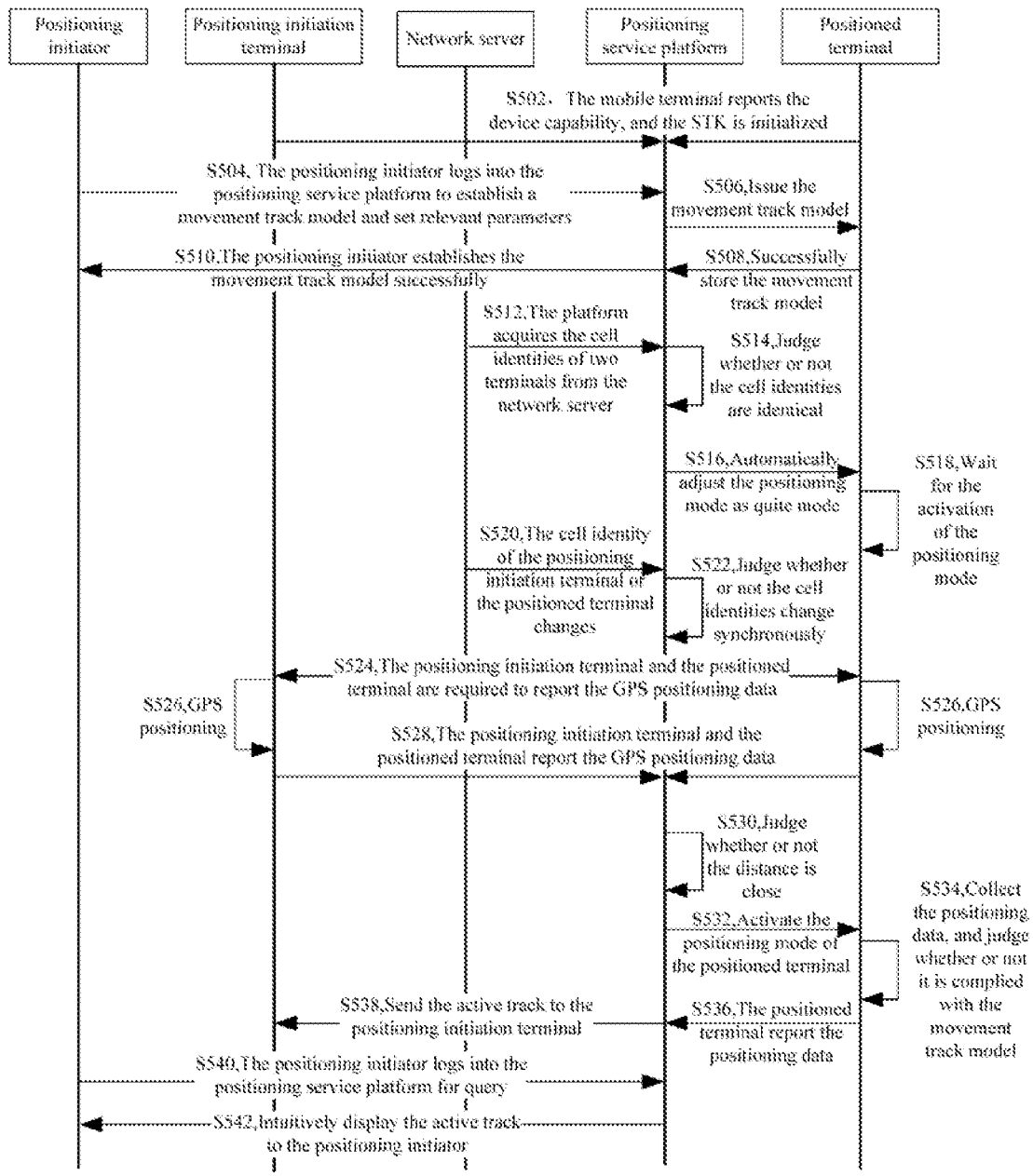
FIG. 5 is a schematic diagram of a positioning service method according to a preferred embodiment of the disclosure.

FIG. 5 is a schematic diagram of a positioning service method according to a preferred embodiment of the disclosure. As shown in FIG. 5, the positioning service method mainly includes the steps as follows.

Step S502: A mobile terminal reports a device capability, and an STK is initialized. According to the device capability reported by the mobile terminal, a positioning service platform provides high precision and low precision positioning services to a positioning initiator for selection.

Step S504: The positioning initiator logs into the positioning service platform by way of number and password authentication to establish a movement track model and set relevant parameters. The establishment of the movement track model is based on the movement track(s) of one day or continuous days, and during this process, a location threshold range and a time threshold range are also required to be set.

Step S506: The movement track model established by the user is issued to the positioned terminal.

Step S508: The positioned terminal returns storage success information after having stored the movement track model.

Step S510: The positioning service platform prompts the positioning initiator that the movement track model is established successfully.

Step S512: The positioning service platform acquires a cell identity of a network where the positioning initiation terminal resides and a cell identity of a network where the positioned terminal resides by way of a network server.

Step S514: The positioning service platform judges whether or not the cell identities of the positioning initiation terminal and the positioned terminal are identical. If they are identical, step S516 is executed; otherwise, step S534 is executed.

Step S516: The positioning service platform issues an instruction to the positioned terminal to automatically adjust the positioning mode as a silence mode.

Step S518: After receiving the instruction, the positioned terminal pauses the positioning service and waits for an instruction for activating the positioning mode, Step S520: The cell identity of the positioning initiation terminal or the positioned terminal changes, which is reported to the positioning service platform by way of the network server.

Step S522: The positioning service platform judges whether or not the cell identities of the positioning initiation terminal and the positioned terminal are still identical. If the cell identities are identical, then step S518 is executed. If the cell identities are different, when both the positioning initiation terminal and the positioned terminal have an accurate GPS positioning function, then step S524 is executed; otherwise, step S532 is executed.

Step S524: The positioning service platform requires the positioning initiation terminal and the positioned terminal to report GPS positioning data.

Step S526: The positioning initiation terminal and the positioned terminal collect the GPS positioning data respectively.

Step S528: The positioning initiation terminal and the positioned terminal report the collected GPS positioning data (both success and failure data are reported) respectively.

Step S530: The positioning service platform judges whether or not the distance between the positioned terminal and the positioning initiation terminal is close by calculating the GPS positioning data reported by the two terminals, and if the distance is close, step S518 is executed; otherwise, step S532 is executed.

Step S532: The positioning service platform issues an instruction to the positioned terminal to activate the positioning mode of the positioned terminal.

Step S534: The positioned terminal collects the positioning data and compares the same with the movement track model in the present terminal to check whether or not the positioning data satisfy the movement track model. If the positioning data satisfy the movement track model, continue to execute step S534; otherwise, step S536 is executed.

Step S536: The positioned terminal reports the positioning data to the positioning service platform for storage and possessing by way of wireless network connection.

Step S538: The positioning service platform regularly sends the movement track of the positioned terminal in the very day to the positioning initiation terminal.

Step S540: The positioning initiator logs into the positioning service platform to query relevant data of the positioned terminal.

Step S542: The positioning service platform presents information such as the movement track of the positioned terminal, the difference between the movement track and the movement track model and so on to the positioning initiator for the positioning initiator to update the movement track model and relevant parameters.

Hereinafter, the above preferred embodiments will be further described in detail in conjunction with an example of the technical specification of the family member positioning service.

Figure 6:
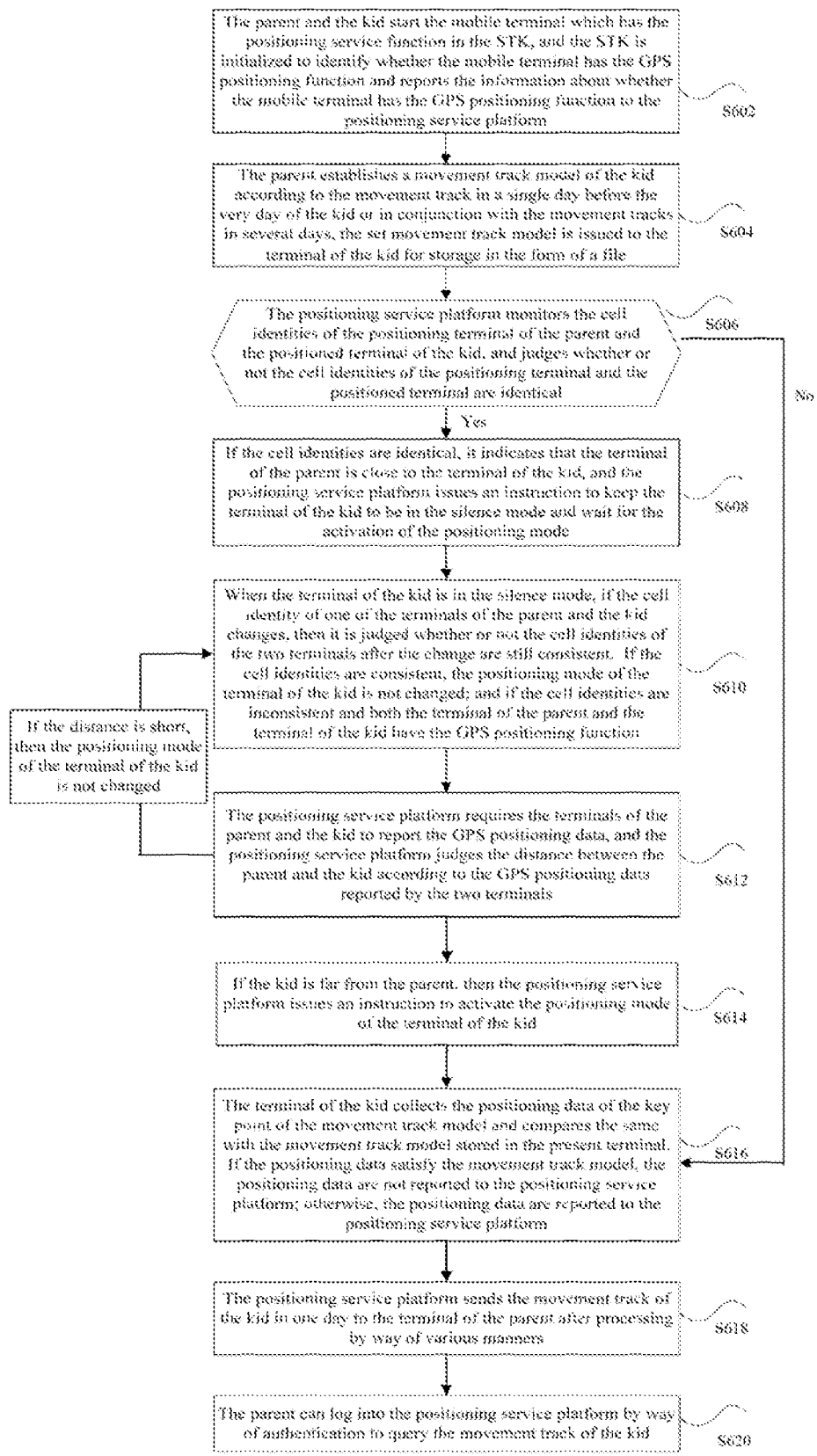
FIG. 6 is a flowchart of a positioning service method according to an example of the disclosure.

FIG. 6 is a flowchart of a positioning service method according to an example of the disclosure. In this example, a parent of a kid is the positioning initiator, the kid is the person to be positioned, and the parent and the kid have already used the positioning service provided by the operator. As shown in FIG. 6, the positioning service method mainly includes the following processing.

Step S602: The parent and the kid start the mobile terminal which has the positioning service function in the STK, and the STK is initialized to identify whether the mobile terminal has the GPS positioning function and reports the information about whether the mobile terminal has the GPS positioning function to the positioning service platform.

Step S604: The parent logs into the positioning service platform by way of authentication, establishes a movement track model of the kid according to the movement track in a single day before the very day of the kid or in conjunction with the movement tracks in several days, sets the coordinate and time of the key point, and sets the location threshold range and the time threshold range. The set movement track model is issued to the terminal of the kid for storage in the form of a file.

Step S606: The positioning service platform monitors the cell identities of the positioning terminal of the parent and the positioned terminal of the kid, and judges whether or not the cell identities of the positioning terminal and the positioned terminal are identical, and if the cell identities are identical, step S608 is executed, and if the cell identities are different, step S616 is executed.

Step S608: if the cell identities are identical, it indicates that the terminal of the parent is close to the terminal of the kid (i.e. the parent is close to the kid, for example, the situation that the parent and the kid go out for a tour at weekends), and the positioning service platform issues an instruction to keep the terminal of the kid to be in the silence mode and wait for the activation of the positioning mode.

Step S610: When the terminal of the kid is in the silence mode, if the identity of one of the terminals of the parent and the kid changes, then it is judged whether or not the cell identities of the two terminals after the change are still consistent. If the cell identities are consistent, the positioning mode of the terminal of the kid is not changed; and if the cell identities are inconsistent, when both the terminal of the parent and the terminal of the kid have the GPS positioning function, step S612 is executed, otherwise, the positioning service platform issues an instruction to activate the positioning mode of the terminal of the kid, and then step S606 is executed.

Step S612: The positioning service platform requires the terminals of the parent and the kid to report the GPS positioning data, and the positioning service platform judges the distance between the parent and the kid according to the GPS positioning data reported by the two terminals, and if the distance is short (such as within 100 m), then the positioning mode of the terminal of the kid is not changed and step S610 is executed.

Step S614: If the distance is large (such as beyond 100 m), then the positioning service platform issues an instruction to activate the positioning mode of the terminal of the kid.

Step S616: The terminal of the kid collects the positioning data of the key point of the movement track model and compares the same with the movement track model stored in the present terminal. If the positioning data satisfy the movement track model, the positioning data are not reported to the positioning service platform; otherwise, the positioning data are reported to the positioning service platform.

Step S618: The positioning service platform sends the movement track of the kid in one day to the terminal of the parent after processing by way of various manners (short messages, multimedia messages, etc.).

Step S620: The parent can log into the positioning service platform by way of authentication to query the movement track of the kid.

In summary, by virtue of the above embodiments provided by the disclosure, the condition restriction of specially customized terminals can be cast off by integrating the positioning service into the STK service, which enables the positioning service to be applied more widely and bring more commercial values to the operator. The positioning mode can be automatically adjusted according to the physical distance between the positioning initiation terminal and the positioned terminal in conjunction with the function of the positioning service platform, thus the positioning mode can be automatically adjusted as the silence mode in case of positioning is not needed when the positioning initiation terminal is close to the positioned terminal, which can reduce the direct participation of the user and can save the electricity quantity consumption of the positioned terminal. The positioning initiator is allowed to establish a movement track model, and the positioned terminal decides whether or not to report the positioning data according to the comparison result between the positioning data and the issued movement track model after collecting the positioning data, which can reduce network data traffic, thus saving fees for the user and improving user experience.

Obviously, those skilled in the art shall understand that the above-mentioned modules and steps of the disclosure can be realized by using general purpose calculating device, can be integrated in one calculating device or distributed on a network which consists of a plurality of calculating devices. Alternatively, the modules and the steps of the disclosure can be realized by using the executable program code of the calculating device. Consequently, they can be stored in the storing device and executed by the calculating device, or they are made into integrated circuit module respectively, or a plurality of modules or steps thereof are made into one integrated circuit module. In this way, the disclosure is not restricted to any particular hardware and software combination.

The descriptions above are only the preferable embodiment of the disclosure, which are not used to restrict the disclosure. For those skilled in the art, the disclosure may have various changes and variations. Any amendments, equivalent substitutions, improvements, etc. within the principle of the disclosure are all included in the scope of the protection of the disclosure.

What is claimed is:

1. A positioning service method, comprising:
a positioned terminal receiving a movement track model established by a positioning service platform;
the positioned terminal judging whether or not positioning data that are collected satisfy the movement track model;
when the positioning data satisfy the movement track model, determining that there is no need to report the positioning data, and when the positioning data do not satisfy the movement track model, reporting the positioning data to the positioning service platform; and
the positioning service platform determining whether or not to adjust a positioning mode of the positioned terminal according to a distance between a positioning initiation terminal and the positioned terminal, wherein the positioning mode comprises: a silence mode and an activated positioning mode, the positioning service platform determining whether or not to adjust the positioning mode of the positioned terminal according to the distance between the positioning initiation terminal and the positioned terminal comprises: the positioning service platform judging, according to network side data, whether or not a cell identity of a mobile network to which the positioning initiation terminal registers and a cell identity of a mobile network to which the positioned terminal registers are identical; if the cell identity of the mobile network to which the positioning initiation terminal registers and the cell identity of the mobile network to which the positioned terminal registers are identical, then the positioning service platform determining that the distance between the positioning initiation terminal and the positioned terminal is less than a preset threshold, and issuing an instruction to adjust the positioning mode of the positioned terminal as the silence mode; when a cell identity of a network where the positioning initiation terminal or the positioned terminal resides changes, the positioning service platform judging whether or not there is a need to adjust the positioning mode of the positioned terminal as the activated positioning mode.

2. The method according to claim 1, wherein the positioned terminal judging whether or not the positioning data that are collected satisfy the movement track model comprises:
the positioned terminal judging whether or not the positioning data that are collected satisfy a coordinate location condition and a time point condition simultaneously; and
if the positioning data that are collected satisfy both the coordinate location condition and the time point condition simultaneously, determining that the positioning data satisfy the movement track model, and if the positioning data that are collected do not satisfy the coordinate location condition and the time point condition simultaneously, determining that the positioning data do not satisfy the movement track model.

3. The method according to claim 2, wherein the movement track model comprises: a coordinate location, a time point, a location threshold range, and a time threshold range;
judging whether or not the positioning data that are collected satisfy the coordinate location condition comprises: judging whether or not a coordinate location in the positioning data is within an allowed range specified by the location threshold range and the coordinate location of a key location in the movement track model; and
judging whether or not the positioning data that are collected satisfy the time point condition comprises: judging whether or not a collection time point of the positioning data is within an allowed range specified by the time threshold range and the time point of a key location in the movement track model.

4. The method according to claim 1, wherein before the positioned terminal collects the positioning data, the method further comprises:
when a subscriber identity module tool kit (STK) service module of the positioned terminal is initialized, receiving device capability information from the positioned terminal; and
the STK service module judging whether or not the positioned terminal has a global positioning system (GPS) positioning function according to the device capability information.

5. The method according to claim 4, wherein after the STK service module judges whether or not the positioned terminal has the GPS positioning function according to the device capability information, the method further comprises:
if the positioned terminal has the GPS positioning function, the STK service module notifying the positioned terminal to collect the positioning data, and the positioned terminal performing the GPS positioning function to collect the positioning data, and if the collection has failed, the positioned terminal performing a low precision positioning function according to a cell identity to collect the positioning data; and
if the positioned terminal does not have the GPS positioning function, the positioned terminal performing the low precision positioning function to collect the positioning data.

6. The method according to claim 1, wherein when both the positioning initiation terminal and the positioned terminal have a GPS positioning function, the positioning service platform judging whether or not there is the need to adjust the positioning mode of the positioned terminal as the activated positioning mode comprises:
the positioning service platform notifying the positioning initiation terminal and the positioned terminal to collect and report a coordinate location;
the positioning service platform determining whether or not the distance between the positioning initiation terminal and the positioned terminal is less than the preset threshold according to the coordinate location reported by the positioning initiation terminal and the coordinate location reported by the positioned terminal; and
if the distance between the positioning initiation terminal and the positioned terminal is not less than the preset threshold, determining to adjust the positioning mode of the positioned terminal as the activated positioning mode.

7. A positioning service system, comprising a positioned terminal, wherein the positioned terminal comprises:
a receiving module, configured to receive a movement track model established by a positioning service platform;

a judgment module, configured to judge whether or not positioning data that are collected satisfy the movement track model;
a determination module, configured to determine that there is no need to report the positioning data when the positioning data satisfy the movement track model;
a reporting module, configured to report the positioning data to the positioning service platform when the positioning data do not satisfy the movement track model; and
a positioning service platform, configured to determine whether or not to adjust a positioning mode of the positioned terminal according to a distance between a positioning initiation terminal and the positioned terminal, wherein the positioning mode comprises: a silence mode and an activated positioning mode;
wherein the positioning service platform comprises: a first judgment module, configured to judge whether or not a cell identity of a mobile network to which the positioning initiation terminal registers and a cell identity of a mobile network to which the positioned terminal registers are identical according to network side data; an adjustment module, configured to, if an output of the judgment module is yes, determine that the distance between the positioning initiation terminal and the positioned terminal is less than a preset threshold, and issue an instruction to adjust the positioning mode of the positioned terminal as the silence mode; and a second judgment module, configured to, when a cell identity of a network where the positioning initiation terminal or the positioned terminal resides changes, judge whether or not there is a need to adjust the positioning mode of the positioned terminal as the activated positioning mode.

8. The system according to claim 7, wherein the positioned terminal further comprises:
a subscriber identity module tool kit (STK) service module, configured to, when being initialized, receive device capability information from the positioned terminal and judge whether or not the positioned terminal has a global positioning system (GPS) positioning function according to the device capability information.

9. The system according to claim 7, wherein
the second judgment module comprises:
a notification unit, configured to notify the positioning initiation terminal and the positioned terminal to collect and report a coordinate location;
a judgment unit, configured to determine whether or not the distance between the positioning initiation terminal and the positioned terminal is less than the preset threshold according to the coordinate location reported by the positioning initiation terminal and the coordinate location reported by the positioned terminal; and
a determination unit, configured to, when an output of the judgment unit is no, determine to adjust the positioning mode of the positioned terminal as the activated positioning mode;
the positioned terminal is further configured to perform a GPS positioning function and report the coordinate location corresponding to the positioned terminal to the positioning service platform; and
the system further comprises: the positioning initiation terminal, configured to perform the GPS positioning function and report the coordinate location corresponding to the positioning initiation terminal to the positioning service platform.

* * * * *